(12) United States Patent
Johnson

(10) Patent No.: US 7,581,218 B2
(45) Date of Patent: Aug. 25, 2009

(54) TRANSACTION PROCESSING IN A DISTRIBUTED DATA PROCESSING SYSTEM

(75) Inventor: Peter J. Johnson, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1771 days.

(21) Appl. No.: 10/121,271

(22) Filed: Apr. 12, 2002

(65) Prior Publication Data

US 2003/0041096 A1 Feb. 27, 2003

(30) Foreign Application Priority Data

Aug. 22, 2001 (GB) ................................. 0120370.2

(51) Int. Cl.
*G06F 9/44* (2006.01)
(52) U.S. Cl. ...................................... 717/172; 717/122
(58) Field of Classification Search ......... 717/120–123, 717/168–178; 709/230–237
See application file for complete search history.

(56) References Cited

U.S. PATENT DOCUMENTS

| 6,006,034 A | 12/1999 | Heath et al. .................. 717/170 |
| 6,199,204 B1 | 3/2001 | Donohue ..................... 717/178 |

FOREIGN PATENT DOCUMENTS

EP 1083482 A2 3/2001

OTHER PUBLICATIONS

Network Working Group, "Hypertext Transfer Protocol—HTTP/1.1", http://www.www.ietf.org/rfc/rfc2616.txt, pp. 1-176, Jun. 1999.*

Aghdaie et al., "Client-Transparent Fault-Tolerant Web Service", IEEE, pp. 209-216, Apr. 2001.*
Heidemann et al., "Modeling the Performance of HTTP Over Several Transport Protocols", IEEE, pp. 616-630, Oct. 1997.*
SSL Version 3.0, Appendix E, Netscape Communications Corporation, Mar. 1996, http://home.netscape.com/eng/ss13/4-APPN.HTM. pp. 10-16.
Research Disclosure, May 2001, No. 445, "Method to Update Java Class Library in Client Computer at Runtime", pp. 847.
IBM Technical Disclosure Bulletin, Mar. 1997, vol. 40, No. 03, "Method for Enabling Software Updates through the Internet", pp. 123-124.

* cited by examiner

*Primary Examiner*—Ted T Vo
(74) *Attorney, Agent, or Firm*—Jerry W. Herndon; Steven M. Greenberg; Carey Rodriguez Greenberg & Paul, LLP

(57) ABSTRACT

A method of pre-processing a transaction within an application program in a distributed data processing system. The system comprises a network, a first computer system, a second computer system and a communication channel between the computer systems for communicating over the network. Each of the computer systems comprises a processor, memory for storing transactions and an operating system for executing the application program. Firstly, the first computer system sends a transaction, which is received by the second computer system. Next, the second computer system determines whether the transaction is current. If the transaction is current, the second computer system forwards the transaction for processing. If the transaction is not current, the second computer system sends software to the first computer system, in order to update the transaction. Once the first computer system has received the software, it applies the software to the transaction.

10 Claims, 5 Drawing Sheets

```
<? xml version = "1·0"? >
   < Contract >
      < Contract Info >
         < Contract Name > Purchase Order </ Contract Name >
         < Contract Version >    V1      </ Contract Version >
                          ·
                          ·
                          ·
                          ·
```

```
<? xml version = "1·0"? >
   < Contract >
      < Contract Info >
         < Contract Name > Purchase Order </ Contract Name >
         < Contract Version >    V2      </ Contract Version >
                          ·
                          ·
                          ·
                          ·
```

TRANSACTION PROCESSING IN A DISTRIBUTED DATA PROCESSING SYSTEM

FIELD OF THE INVENTION

The present invention relates to transaction processing between computers in a distributed computing environment.

BACKGROUND OF THE INVENTION

Increasingly, the Internet is becoming more popular as a medium for electronic transactions, for example, between a customer's client computer and a vendor's server computer. The Internet is a network of computer networks having no single owner or controller and including large and small, public and private networks. Any connected computer running Internet Protocol (IP) software is, subject to security controls, capable of exchanging information with any other computer that is also connected to the Internet.

The World Wide Web (WWW) is a wide area information retrieval facility which provides access to an enormous quantity of network-accessible information and which can provide low cost communications between computers in a distributed environment. Web browser technology, a Web browser being an application running on a client computer, has propelled the Internet to what has now become a pervasive and nearly universal information superhighway whereby a wealth of information can be readily retrieved and delivered to any requesting end user. Web browsers, for example, Netscape Navigator (Netscape Navigator is a registered trademark of Netscape Communications Corporation) or Microsoft Internet Explorer (Microsoft Internet Explorer is a trademark of Microsoft Corporation), enable users to access information by specification of a link via a Uniform Resource Locator (URL) and to navigate between different Web pages.

Along with the increase in the level of activities on the Internet, the need to exchange sensitive information over secured channels becomes important as well. For example, in a typical transaction, a customer at a client computer with Internet access to a vendors' Web site, can manually check lists of the latest available versions of products and then order and purchase the products on-line.

There is obviously a need to provide a secure environment for transactions and communications between computers. Secure Sockets Layer (SSL) protocol is a de-facto standard from Netscape Communications Corporation for establishing a secure channel for communication over the Internet, whereby data can be sent securely utilising that channel, between a server computer and a client computer. Essentially, SSL aims to provide an environment for (mainly) secure financial transactions and utilises public key encryption.

The SSL protocol is comprised of two sub-protocols, namely, the SSL Record protocol and the SSL Handshake protocol. The SSL Record protocol is layered on top of some reliable transport protocol, such as the Transport Control Protocol (TCP) and defines the format for data transmission. The SSL Handshake protocol utilises the SSL Record protocol to allow a server computer and client computer to authenticate each other and negotiate an encryption algorithm and cryptographic keys before any data is communicated.

While the SSL protocol is designed for use in many applications, its main application has been with Web browsers. By issuing an "https://" (Hypertext Transfer Protocol with SSL) addressing command to the Web browser rather than an "http://" (Hypertext Transfer Protocol command), a transaction through a secured communication channel is requested. The Web browser responds accordingly by establishing a secured communication channel to carry out secured transactions between a client computer and a server computer.

The problem with application to application communication in SSL is that a client computer at a higher version level of communication requests than the respective server computer, must only communicate with the server computer utilising requests at the lower version supported by the server computer. Additionally, a server computer at a particular current version level can accept requests at either that particular current version, or requests at a lower version than that particular current version. This is undesirable because, in effect, client computers (or server computers) are utilising an outdated version of requests.

Furthermore, in other communication techniques, if a client computer communicates with a server computer utilising requests at a previous version level, the client computer's request may be rejected altogether. For example, in HTTP, an error occurs when a client computer sends a request at a version level that the server computer does not support or refuses to support. Alternatively, the relevant proxy or gateway is made to downgrade to the request version level being utilised by the client computer.

U.S. Pat. No. 6,199,204 B1 provides a method and mechanism for automating updating of computer programs. Conventionally, computer programs have been distributed on a recording medium for users to install on their computer systems. Each time fixes, additions or new versions for the programs were developed, a new CD or diskette is required to be delivered to users to enable them to install the update. More recently some software has been downloadable across a network, but the effort for users to obtain and install updates and the effort for software vendors to distribute updates remains undesirable. The invention provides an updater agent which is associated with a computer program and which accesses relevant network locations and automatically downloads and installs any available updates to its associated program if those updates satisfy predefined update criteria of the updater agent. The updater agents are able to communicate with each other and so a first updater agent can request updates to programs that are prerequisites to its associated program. This prior art utilises agents to update software programs, whereby the updating depends on predefined criteria. Additionally, it is software programs that are updated, rather than requests between computers.

Generally, it should not be assumed that a customer wanting to do business with a vendor is utilising the latest version of communications means.

Also, it is undesirable to turn away a customer wishing to carry out an electronic business transaction, even if he/she has a previous version of communications means. Therefore, there is a need to accept a customer's transactions, whilst also maintaining the version level of communications means being utilised at both the server and client end.

SUMMARY OF THE INVENTION

According to a first aspect, the present invention provides a method of pre-processing a transaction within an application program in a distributed data processing system comprising: a network; a first computer system, a second computer system, each of said first computer system and said second computer system comprising a processor, memory for storing said transaction and an operating system for executing said application program; and means for establishing a communication channel between said first computer system and said second computer system over said network, said method comprising the steps of: sending, by said first computer system, a transaction; receiving, by said second computer system, said transaction; determining, by said second computer system, if said transaction is current; in response to a successful determining step, forwarding said transaction for processing, by said second computer system; in response to an unsuccessful determining step, sending, by said second computer system, means for updating said transaction to an updated transaction; receiving, by said first computer system, said means for updating, and applying, by said first computer system, said means for updating to said transaction. By allowing the first computer system (for example, a client computer) to update the transaction, the processing overhead is moved from the second computer system (for example, a server computer) and thus, allows the second computer system to work more efficiently.

Preferably, in response to an unsuccessful determining step, the method further comprises the steps of: re-sending, by the first computer system, the updated transaction; receiving, by the second computer system, the updated transaction, and in response to the receiving step, forwarding the updated transaction for processing, by the second computer system. More preferably, the means for updating is applied to a stored transaction, whereby the transaction is stored in memory on the first computer system.

In a preferred embodiment, the transaction is textual and the means for updating is an algorithm for parsing the textual transaction. Preferably, the first computer system and the second computer system communicate utilising a handshake protocol exchange. More preferably, the transaction and the means for updating are exchanged utilising a single communication channel. In a preferred embodiment, the communication channel is secure and therefore the transaction is not vulnerable to interception by unwanted parties.

Preferably, the first computer system is one of a server computer or a client computer and the second computer system is one of a server computer or a client computer. However, the present invention could be implemented in any environment. For example, communication could take place between two or more server computers, between two or more client computers, between a plurality of both server computers and client computers etc.

According to a second aspect, the present invention provides a distributed data processing system for pre-processing a transaction within an application program comprising: a network; a first computer system, a second computer system, each of said first computer system and said second computer system comprising a processor, memory for storing said transaction and an operating system for executing said application program; and means for establishing a communication channel between said first computer system and said second computer system over said network, said distributed data processing system further comprising: means for sending, by said first computer system, a transaction; means for receiving, by said second computer system, said transaction; means for determining, by said second computer system, if said transaction is current; means, responsive to successful determining, for forwarding said transaction for processing, by said second computer system; means, responsive to unsuccessful determining, for sending, by said second computer system, means for updating said transaction to an updated transaction; means for receiving, by said first computer system, said means for updating, and means for applying, by said first computer system, said means for updating to said transaction.

Preferably, in response to unsuccessful determining, the system further comprises: means for re-sending, by the first computer system, the updated transaction; means for receiving, by the second computer system, the updated transaction, and means, responsive to the receiving means, for forwarding the updated transaction for processing, by the second computer system. More preferably, the means for updating is applied to a stored transaction.

According to a third aspect, the present invention provides a computer program product comprising computer program code stored on a computer readable storage medium which, when executed on a computer, performs the method as described above.

BRIEF DESCRIPTION OF THE DRAWINGS

The present invention will now be described, by way of example only, with reference to preferred embodiments thereof, as illustrated in the following drawings:

FIG. 3 shows an example of a request utilised in the transaction processing system of FIG. 2;

FIG. 6 shows an example of the resulting request proceeding the version updating process of FIGS. 4 and 5, according to the present invention.

DETAILED DESCRIPTION OF THE PREFERRED EMBODIMENTS OF THE INVENTION

Figure 1:
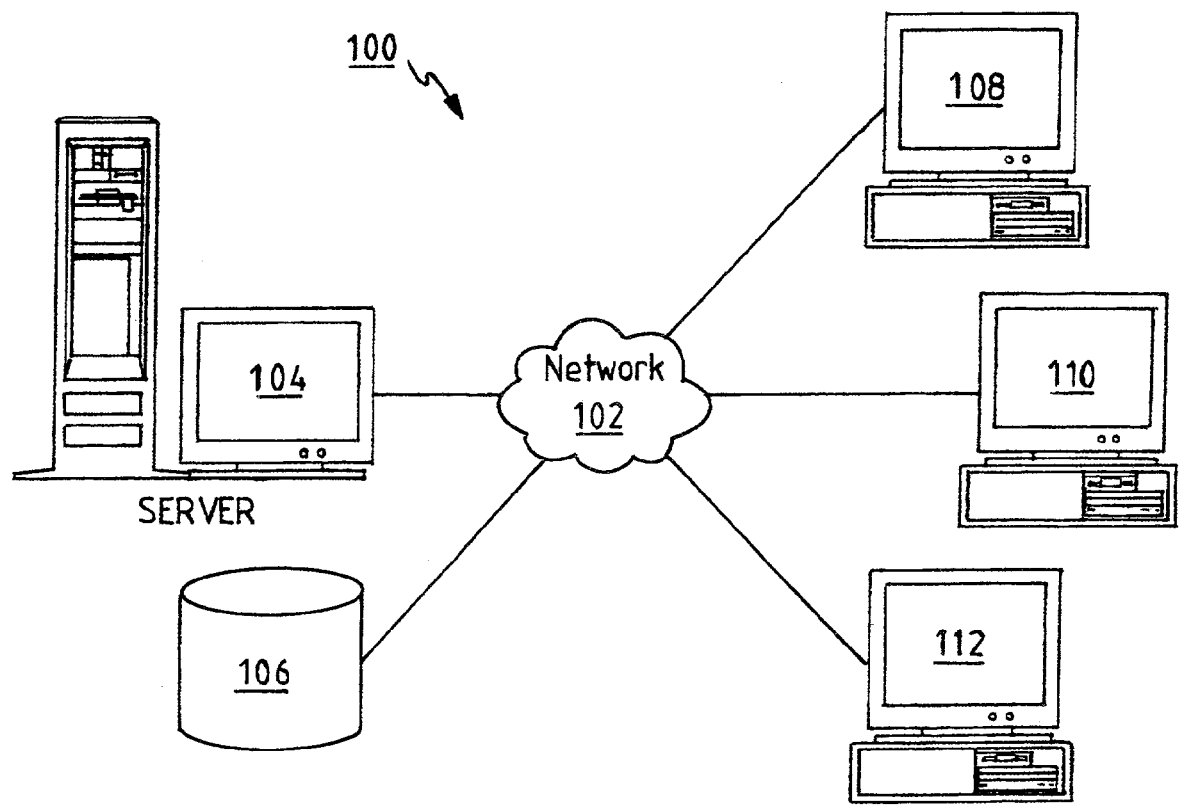
FIG. 1 shows a distributed data processing system in which the present invention may be implemented.

FIG. 1 shows a representation of a distributed data processing system in which the present invention may be implemented. Distributed data processing system (100) comprises a number of computers, connected by a network (102). Server computer (104) is preferably a Web server and is connected to network (102) along with a storage unit (106) and client computers (108), (110) and (112). In the depicted example, distributed data processing system (100) is the Internet, with network (102) representing a world-wide collection of networks and gateways that use the transmission control protocol over internet protocol (TCP/IP) suite of protocols to communicate with one another.

Generally, the present invention provides a technique for transaction processing in a distributed environment. More specifically, the present invention allows co-operative exchange of software, such as, a computer program or algorithm, to control or format versions of data exchanged between computers. Preferably, the co-operative exchange of software between computers occurs during a "handshake" process. This involves the transmission of signals to acknowledge that communication or data transfer can occur between computers. Preferably, the data is textual and is held within a document for example. Preferably, computers co-operating to exchange software are configured to support the technique provided by the present invention, for example, via an application program running on the computers.

In a preferred embodiment, communication and data transfer occurs in a secure environment. For example, if a security function such as a password is to be updated to a current version, security features would implemented so that the password is not vulnerable to interception by unwanted parties. To prevent intrusion, data encryption methods are used to protect information during transmission from one end point to another. Encryption scrambles the data to make it unintelligible during transmission. In encryption systems, plain data is converted to a secure coded data (ciphertext) using an encryption method or algorithm with a secret key. A secret key is a usually a string of characters known only to the sender and the recipient. The recipient at the intended destination can decrypt the data by using the previously agreed secret key and the reverse of the encryption algorithm.

Figure 2:
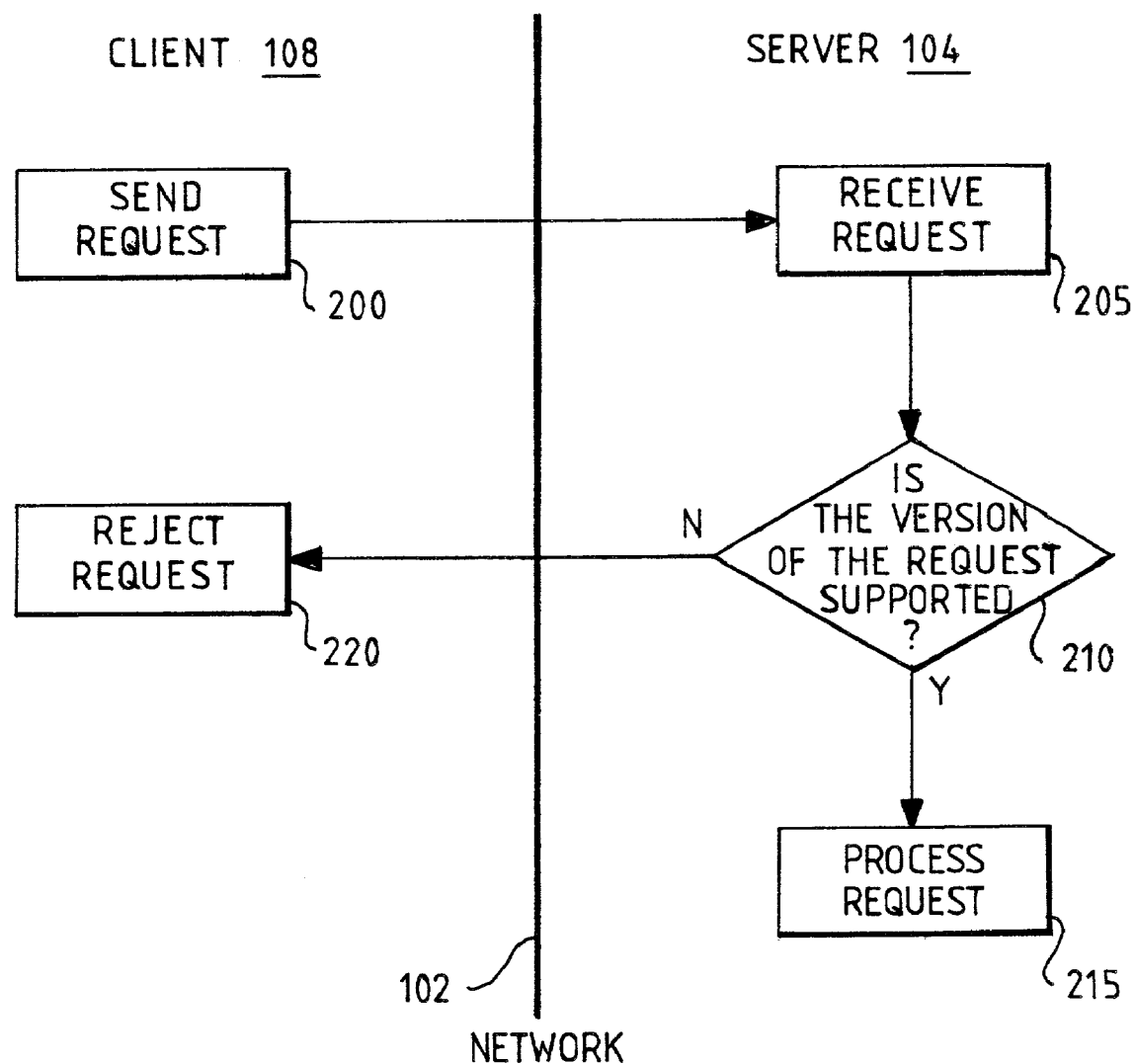
FIG. 2 is a flow chart showing the operational steps involved in a transaction processing system.

The problems associated with current systems will now be described in more detail, using a distributed system for business to business transactions as an example. In FIG. 2, a customer at a client computer (108) firstly sends (step 200) a request over a network (102) to a vendor's server computer (104). It should be understood that the term "request" herein, represents data held within a document and a request could also be interpreted as a "transaction". An example of a request is a document for a purchase order. Although the network in this example is a world-wide collection of networks and gateways, it should be understood that any network or collection of networks could be utilised. Next, the server computer (104) receives (step 205) the request.

At this stage, the server computer (104) carries out some processing to determine (step 210) whether the version of the request from the client computer (108) is at the minimum version level required for transaction processing. The processing carried out by the server computer (104) could involve utilising an algorithm for checking the request for example. Preferably, in this example, the processing involves checking a data field within the request. It should be understood that the processing could be carried out in any other way.

If the determining step is successful, that is, a positive result to step 210, then the request is processed (step 215) by the server computer (104). After processing (step 215) has finished, one response from the server computer (104) may be to send an invoice to the customer. It should be understood that the processing of the request could be carried out on any computer—for example, the request could be forwarded to another server computer for processing.

However, if the determining step is not successful, that is, a negative result to step 210, then the request is rejected (step 220) by the server computer (104). In this case, the customer's request is not processed and the customer is preferably made aware of this. Rejection of requests is obviously undesirable because business from customers is being turned away.

An alternative response from the server computer (104) to a negative result at step 210 may be to downgrade to a request version supported by the customer, as described above, with reference to prior art techniques. Obviously this is also undesirable since neither the vendor nor the customer can benefit from the functionality provided by an up-to-date version of communications means. Additionally, vendors utilising the prior art technique of downgrading, appear to the customer as advocating "backward compatibility", and in today's competitive business environment, this is not desirable.

Referring to FIG. 3, there is shown an example of the request described in FIG. 2. In this case, the request is an extensible Markup Language (XML) document (300). Within the example document (300) are various data fields. The first field denotes the version of the XML programming language being utilised by the customer and in this case, it is version "1". This is a standard field within any XML document. The next field denotes that the document (300) is a "contract" and the field below it indicates the beginning of the "contract information". Below the "<ContractInfo>" field, is a data field denoting the "contract name". In this example, the document (300) is a purchase order. The data in the final field represents the version of the customer's document. Furthermore, for the purpose of this example, it is assumed that the vendor is using document version "V2", which is the minimum threshold required for transaction processing.

In FIG. 2, (with reference to FIG. 3), when a customer sends (step 200) the document (300) to the vendor's server computer (104), the server computer (104) carries out some processing (step 210). In this example, the server computer (104) examines the document (300) and checks the "<ContractVersion>" data field. Since the customer's document version, namely "V1", is lower than the minimum threshold, namely "V2", the document (300) is rejected (step 220). Alternatively, in response to a negative result at step 210, the server computer (104) could downgrade to a document version level supported by the customer, as described above, with reference to prior art techniques.

Figure 4:
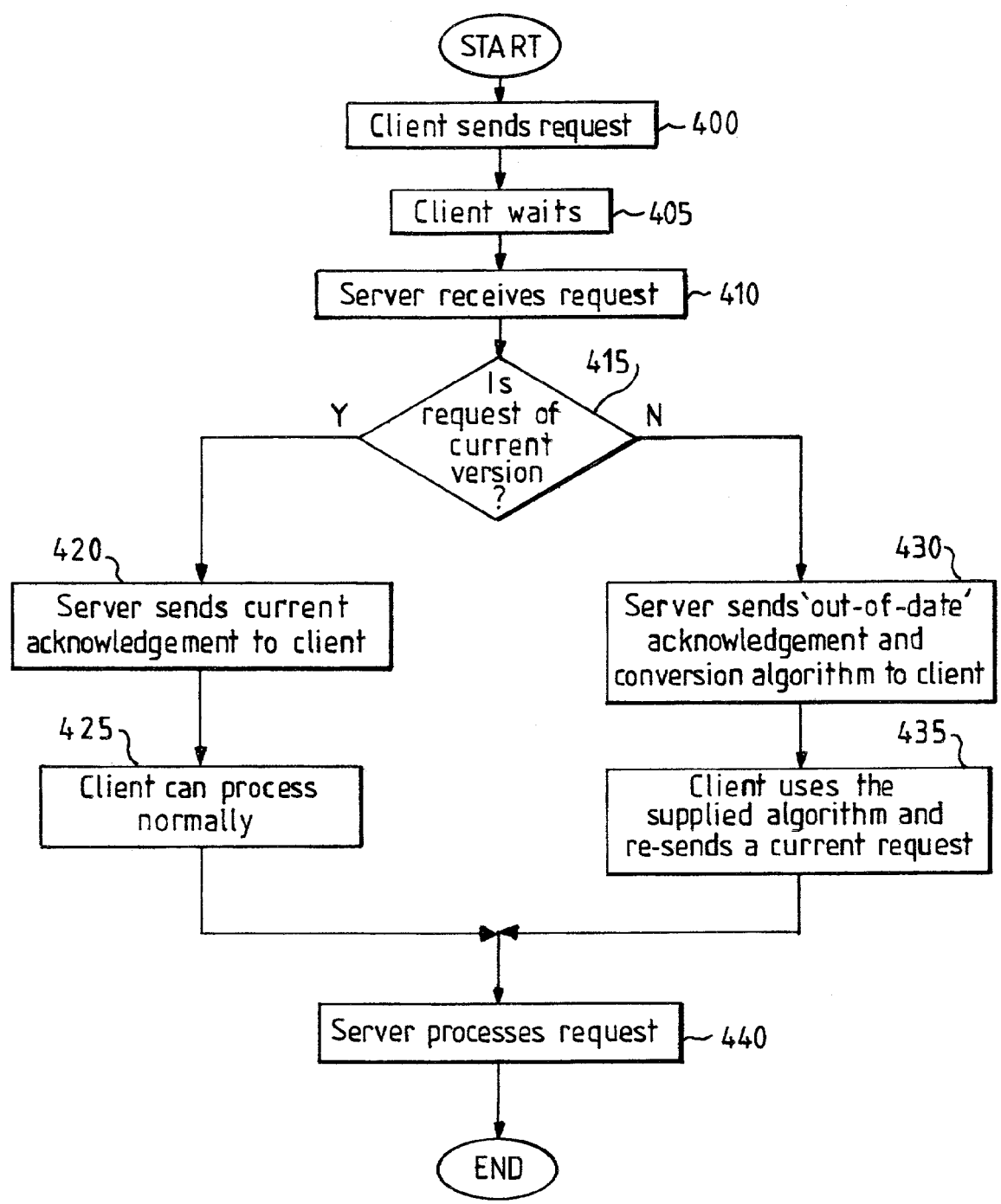
FIG. 4 is a flow chart showing the operational steps involved in version updating of a request in a transaction processing system, according to the present invention.

A preferred embodiment of the present invention will now be described with reference to FIG. 4 and FIG. 5. Firstly, a customer at a client computer (108) sends (step 400 of FIG. 4, (1) OF FIG. 5) a request over the network (102), to a vendor's server computer (104). It should be understood that the request is additionally stored on the client computer. In this example, the request in FIG. 4 and FIG. 5 is again a document for a purchase order. Then, the client computer (108) waits (step 405, (2)) for a response from the server computer (104).

Next the server computer (104) receives and stores (step 410, (3)) the request. At this stage, the server computer (104) carries out some processing, via an algorithm for example, to determine (step 415, (4)) whether the request from the client computer (108) is at the minimum version level required for transaction processing.

Preferably in a first embodiment, if it is determined in step 415, (4), that the request is at the current version level, the server computer (104) sends (step 420, (5)) a signal to the client computer (108) acknowledging this. As a result of step 420, (5), since the client computer (108) has now received information from the server computer (104), it no longer needs to be in a wait state. Therefore, in this example, the client computer (108), in response to the signal, can utilise (step 425, (6)) standard processing on the stored request. That is, there is no need for the client computer (108) to transform the version level of the request. Meanwhile, since the server computer (104) has determined that the request from the client computer (108) is at a current level, it can process (step 440, (8)), the stored, current request. As an example, the processing carried out by the server computer (104) could involve determining whether the item(s) in the customer's purchase order is in stock. It should be understood that the processing of the request could be carried out on any computer.

Figure 5:
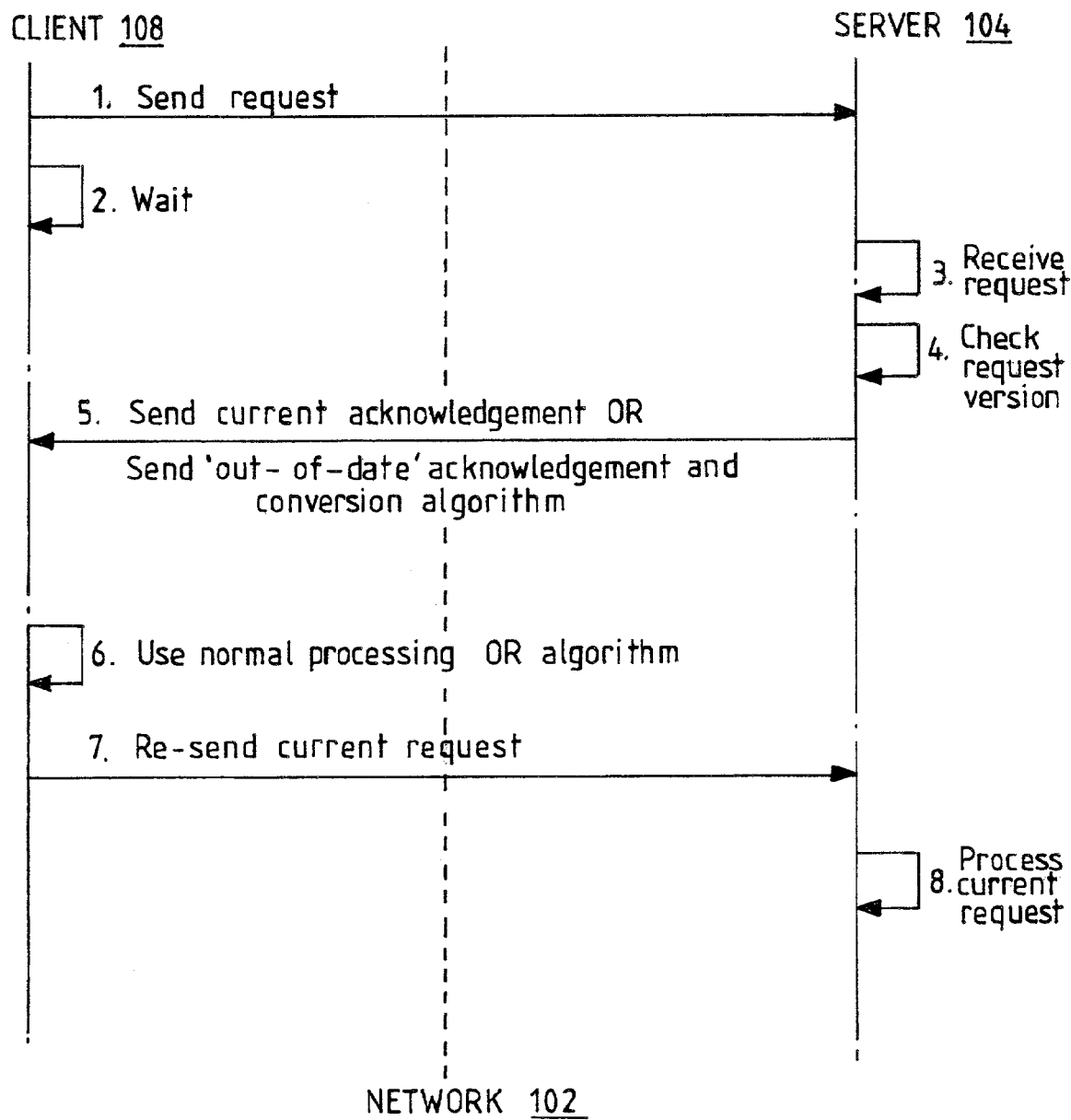
FIG. 5 is a workflow diagram showing the operational steps involved in version updating of a request in a transaction processing system, according to the present invention.

Preferably in a second embodiment, referring back to step 415 in FIG. 4 and (4) in FIG. 5, if it is determined that the request is at an out-of-date version level, the server computer (104) begins a process to initiate a version update. In this example, it sends (step 430, (5)) a signal to the client computer (108) acknowledging that the request is at an out-of-date version level and also sends (step 430, (5)) an algorithm to transform the request to the current version level.

At step 430, (5), it should be understood that if the customer does not wish to apply the conversion algorithm, he/she could exit the process. If the customer does wish to go ahead with the conversion algorithm, as a result of step 430, (5), since the client computer (108) has now received information from the server computer (104), it no longer needs to be in a wait state. The client computer (108), in response to the signal, can utilise (step 435, (6)) the supplied, inbound algorithm to transform the request version level. It should be understood that the request sent over the network in step 400 is stored on the client computer, and it is this stored request that is now transformed in step 435.

It is therefore at step 435, (6), that the client computer (108) takes responsibility for the processing overhead involved with version updating. This is advantageous because the processing overhead is moved from the server computer (104) and thus, allows the server computer (104) to work more efficiently. Once the stored request has been updated to the current version level, the client computer (108) re-sends (step 435, (7)) the now updated request to the server computer (104). The server computer (104) can now process (step 440, (8)), the received, updated request. In this example, the processing carried out by the server computer (104) could involve determining whether the item(s) in the customer's purchase order is in stock. It should be understood that the processing of the request could be carried out on any computer.

To further describe the transaction processing system of FIG. 4, the document (300) of FIG. 3 will be used as an example. Referring back to FIG. 4, when a client computer (108) sends (step 400) the document (300) to the vendor's server computer (104), the server computer (104) carries out some processing. In this example, the server computer (104) examines (step 415) the document (300) by checking the "<ContractVersion>" data field. In this case, the version, "V1", of the customer's document is below the minimum threshold required for transaction processing, "V2".

As described with reference to the second embodiment, instead of rejecting the document (300), the server computer (104) now does some processing to update the document to the required version level, "V2". In this case, the server computer (104) is configured to send (step 430) a conversion algorithm to the client computer (108). Preferably, in this example, the algorithm is a simple parser that takes a textual document and then substitutes words for words. Therefore, in this case, the algorithm's function is to simply change the value of the "<ContractVersion>" data field in the document (300), from "V1" to "V2". Of course, the algorithm could update the version of the document in any other way.

The resulting document (600) is shown in FIG. 6, whereby the value of the "<ContractVersion>" data field is now "V2". Therefore, once the conversion algorithm has completed running, the client computer (108) will have the required document version level. The client computer (108) then re-sends (step 435) the updated document to the server computer (104). The server computer (104) can now process (step 440), the received, updated document.

It should be understood that although the preferred embodiment has been described with a single client computer and a single server computer, the present invention could be implemented in any environment. For example, communication could take place between two or more server computers, between two or more client computers, between a plurality of both server computers and client computers etc.

It will be apparent from the above description that, by using the techniques of the preferred embodiment, a method of transaction processing is provided. The present invention is advantageous in that the co-operative exchange of software can occur without pre-configuration of communication means. However, preferably, the request comprises a field within it indicating the version of the request.

Beneficially, a separate channel of communication between the computers is not required for software exchange and in fact all communication is preferably carried out utilising the same channel as for data exchange. Additionally, the format, style or even the content of the data is not pre-defined or tied to a certain protocol and the present invention therefore provides flexibility.

Furthermore, in the present invention, the customer's request can be updated to the current version level, whilst also maintaining the current version level on the server computer. Advantageously, the processing overhead involved with updating requests is moved to the client computer, enabling the server computer to function more efficiently.

The invention claimed is:

1. A distributed data processing system for pre-processing a transaction within an application program comprising:
   a network;
   a first computer system, a second computer system, each of said first computer system and said second computer system comprising a processor, memory for storing said transaction and an operating system for executing said application program; and
   means for establishing a communication channel between said first computer system and said second computer system over said network, said distributed data processing system further comprising:
   means for sending, by said first computer system, a transaction;
   means for receiving, by said second computer system, said transaction;
   means for determining, by said second computer system, if said transaction is current;
   means, responsive to successful determining, for forwarding said transaction for processing, by said second computer system;
   means, responsive to unsuccessful determining, for sending, by said second computer system, means for updating said transaction to an updated transaction;
   means for receiving, by said first computer system, said means for updating, and means for applying, by said first computer system, said means for updating to said transaction.

2. A distributed data processing system as claimed in claim 1, in which, responsive to unsuccessful determining, said system further comprises:
   means for re-sending, by said first computer system, said updated transaction;
   means for receiving, by said second computer system, said updated transaction, and means, responsive to said receiving means, for forwarding said updated transaction for processing, by said second computer system.

3. A distributed data processing system as claimed in claim 1, in which said means for updating is applied to a stored transaction.

4. A distributed data processing system as claimed in claim 1, in which said transaction is textual.

5. A distributed data processing system as claimed in claim 4, in which said means for updating is an algorithm for parsing said transaction.

6. A distributed data processing system as claimed in claim 1, in which said first computer system and said second computer system communicate utilising a handshake protocol exchange.

7. A distributed data processing system as claimed in claim 1, in which said transaction and said means for updating are exchanged utilising a single communication channel.

8. A distributed data processing system as claimed in claim 1, in which said communication channel is secure.

9. A distributed data processing system as claimed in claim 1, in which said first computer system is one of a server computer or a client computer and in which said second computer system is one of a server computer or a client computer.

10. A computer program product comprising computer program code stored on a computer readable storage medium for pre-processing a transaction within an application program in a distributed data processing system comprising:
- a network;
- a first computer system, a second computer system, each of said first computer system and said second computer system comprising a processor, memory for storing said transaction and an operating system for executing said application program; and
- means for establishing a communication channel between said first computer system and said second computer system over said network, which, when executed on a computer, performs the steps of:
  - sending, by said first computer system, a transaction;
  - receiving, by said second computer system, said transaction;
  - determining, by said second computer system, if said transaction is current;
  - in response to a successful determining step, forwarding said transaction for processing, by said second computer system;
  - in response to an unsuccessful determining step, sending, by said second computer system, means for updating said transaction to an updated transaction;
  - receiving, by said first computer system, said means for updating, and applying, by said first computer system, said means for updating to said transaction.

* * * * *

UNITED STATES PATENT AND TRADEMARK OFFICE
CERTIFICATE OF CORRECTION

PATENT NO. : 7,581,218 B2  Page 1 of 1
APPLICATION NO. : 10/121271
DATED : August 25, 2009
INVENTOR(S) : Peter J. Johnson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1856 days.

Signed and Sealed this

Fourteenth Day of September, 2010

David J. Kappos
*Director of the United States Patent and Trademark Office*